United States Patent [19]

Ellis et al.

[11] Patent Number: 4,625,007

[45] Date of Patent: Nov. 25, 1986

[54] SILICONE-CONTAINING CONTACT LENS MATERIAL AND CONTACT LENSES MADE THEREOF

[75] Inventors: Edward J. Ellis; Jeanne Y. Ellis, both of Georgetown, Mass.

[73] Assignee: Polymer Technology Corporation, Wilmington, Mass.

[21] Appl. No.: 692,904

[22] Filed: Jan. 18, 1985

Related U.S. Application Data

[63] Continuation of Ser. No. 580,478, Feb. 15, 1984, abandoned, which is a continuation of Ser. No. 430,489, Sep. 30, 1982, abandoned.

[51] Int. Cl.$^4$ .............................................. C08F 30/08
[52] U.S. Cl. ..................................... 526/279; 528/32; 556/440; 556/453; 556/455; 556/462; 556/479; 351/160 H; 351/160 R
[58] Field of Search .................. 528/32; 556/440, 453, 556/455, 462, 479; 526/279; 351/160 H, 160 R

[56] References Cited

U.S. PATENT DOCUMENTS

| 3,546,156 | 12/1970 | Baronnier et al. | 528/32 |
| 3,878,263 | 4/1975 | Martin | 528/32 |
| 4,242,483 | 12/1980 | Novicky | 526/279 |
| 4,330,383 | 5/1982 | Ellis et al. | 526/279 |

OTHER PUBLICATIONS

Eaborn, Organosilicon Compounds, Academic Press, Inc. N.Y., pp. 1 to 9, 1960.
McGregor, Silicones and Their Uses, McGraw-Hill Book Co. Inc. N.Y., pp. 222-225.

*Primary Examiner*—Melvyn I. Marcus
*Attorney, Agent, or Firm*—Wolf, Greenfield & Sacks

[57] ABSTRACT

Multifunctional organopolysiloxane resin systems are provided whose starting materials comprise a reactive vinyl containing silane, a disubstituted silane and a trisubstituted silane hydrolyzed together to form a resin system. The preferred material of the resin system has a viscosity of from 7 to 70 centistokes at 25° C. The preferred material is in the form of a contact lens and also contains an ester and a hydrophilic agent.

5 Claims, No Drawings

SILICONE-CONTAINING CONTACT LENS MATERIAL AND CONTACT LENSES MADE THEREOF

RELATED APPLICATIONS

This application is a continuation of application Ser. No. 580,478 filed Feb. 15, 1984, now abandoned, which is a continuation of application Ser. No. 430,489, filed Sept. 30, 1982 (now abandoned).

An unsaturated multifunctional organopolysiloxane is used as a contact lens material in its polymerized form or as a polymerizate with other selected monomers. The contact lens material of this invention is preferably prepared from an acrylate or methacrylate substituted functional polyorganosiloxane.

BACKGROUND OF THE INVENTION

Contact lenses which derive their oxygen permeability from organosiloxane moieties require a substantial content of organosiloxane to provide sufficient oxygen transport to the cornea.

In general organosiloxane molecules tend to be incompatible in many compositions which include other monomers. For example, dissolving organosiloxane in methyl methacrylate and polymerizing said solution often results in an opaque material unsuitable for contact lens use.

Prior art has demonstrated that short organosiloxane units chemically bonded to an unsaturated, polymerizable group provide a means of copolymerizing such organosiloxane monomers with other monomers to achieve a compatible and therefore, transparent material.

On the other hand, organosiloxane units containing only one unsaturated, polymerizable group often times will not provide a random copolymer when copolymerized with other monomers, particularly hydrophilic monomers. This situation leads to phase separation and an opaque material. In certain cases the phase separation is not detectable visually but is evidenced in the physical properties of the material. This condition can provide a material that exhibits brittle behavior and a propensity to fracture.

The physical of highly crosslinked polymer prepared from dimethylsiloxane diacrylate oligomers has been known in the art. In general, microphase separation is suppressed as the amount of dimethylsiloxane groups in the prepolymer increases. This phenomenon is attributed to the absence of long organic sequences. Overall, the work of Katz *J. Polym. Sci. Chem. Ed.* 16(3) 597 (1978) teaches against the copolymerization of such reactive organosiloxane monomers since organic sequences form leading to phase separation. However, in a contact lens material it has been found desirable to include one or more comonomers to provide a proper balance of physical properties.

For contact lens applications it is therefore desirable to provide a random copolymer that contains a substantial amount of compatibilized organosiloxane units. The present invention utilizes branched organopolysiloxane structures containing multiple unsaturated, polymerizable groups. These materials, when copolymerized with other monomers provide compositions which are transparent, highly oxygen-permeable and durable. The random nature of the polymerization process is enhanced by the presence of multiple, unsaturated polymerizable groups. The compatibilization of the organopolysiloxane monomers disclosed is improved through the use of highly branched organopolysiloxane moieties.

SUMMARY OF THE INVENTION

It is an object of this invention to provide novel, unsaturated, multifunctional organopolysiloxanes useful in forming contact lenses alone or in combination with other organic materials.

Another object of this invention is to provide polymerizates of unsaturated, multifunctional organopolysiloxanes in the form of contact lenses which siloxanes can be used alone or in combination with other organic materials.

An additional object of this invention is to provide contact lens materials and contact lenses in accordance with this invention which are oxygen-permeable, dimensionally stable, hydrophilic and of good optical transparency and clarity.

Still another object of this invention is to provide contact lenses in accordance with the preceding objects wherein outstanding hard and semi-hard oxygen-permeable lenses are formed having good strength with reduced brittleness as compared to prior art organosiloxane-containing contact lenses.

According to the invention a contact lens is formed of an unsaturated, multifunctional organopolysiloxanes having the formula:

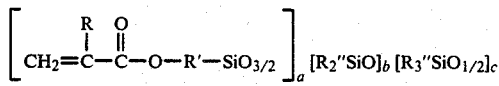

where:
R is hydrogen or methyl
R' is a divalent alkylene radical having from one to five carbon atoms
R" is a monovalent hydrocarbon radical having from one to five carbon atoms, a substituted monovalent hydrocarbon radical having from one to five carbon atoms, a phenyl group, a substituted phenyl group or a cyclohexyl group.
"a"+"b"+"c"=1, where "a", "b" and "c" are each greater than 0

Preferably, the unsaturated, multifunctional organopolysiloxanes of this invention are of the following composition:

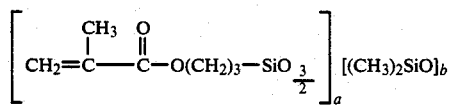

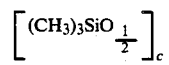

"a"+"b"+"c"=1, where "a", "b" and "c" are each greater than 0

The organopolysiloxanes are branched structures composed of three distinct structural units. The first unit is preferably a reactive organofunctional trioxysilyl unit such as γ-methacryloxypropyl siloxane. The second unit is preferably a chain extender such as a dimethylsiloxane unit while the third unit acts as a cap or end group and is preferably a trimethylsiloxane unit.

Preferably the unsaturated multifunctional organopolysiloxanes of this invention have a viscosity of from 7 to 70 centistokes at 25° C. as measured with a capillary viscometer in ASTM Test No. D-446. The preferred mole fraction range of each of the three units is such that a=from 0.10 to 0.40 moles fraction, b=0.25 to 0.80 mole fraction and c=0.10 to 0.40 mole fraction.

In certain preferred embodiments a contact lens material has a first component of the above formula in an amount of from 30 to 60% by weight with
a=0.20 to 0.35 mole fraction
b=0.40 to 0.60 mole fraction
c=0.20 to 0.40 mole fraction
69 to 40% by weight of methylmethacrylate and 1 to 10% by weight of vinylpyrrolidone, acrylic acid, methacrylic acid or mixtures thereof, with a mixture of the components being polymerized by free radical polymerization to 95% completion or higher.

It is a feature of this invention that contact lenses made from the materials of this invention are preferably hard or semi-rigid, are easily fabricated and finished by conventional means, have excellent dimensional stability, are inherently wettable with suitable refractive index and have good light transmission properties. Such lenses are durable, have good oxygen permeability, are biocompatible with the eye, substantially non-hydrating, are chemically stable and have resistance to proteinaceous accumulation with reasonable scratch resistance. They can be worn safely and comfortably by users for extended periods of time while providing the wearer with good vision. This minimizes handling of the lenses and greatly improves anticipated life.

DESCRIPTION OF PREFERRED EMBODIMENTS

It should be understood that any of the novel organopolysiloxanes of this invention are composed of a variety of molecules, not one specific composition, and therefore are described as by an average or typical composition with perhaps more than one polymerizable group. Such structures are known and described as mixed structures or otherwise known and described as resins.

The three-unit unsaturated, multifunctional organopolysiloxanes of this invention which can be described as resins or resin systems can be prepared utilizing various reaction techniques widely known to the art. Most preferred is the cohydrolysis route in which chlorosilane or alkoxysilane intermediates are used. The cohydrolysis reaction may be carried out in the presence of water miscible solvents such as methanol or ethanol as well as in the presence of water immersible solvents such as diethyl ether, dibutyl ether, toluene, naphtha or chloroform.

The use of acetoxysilane intermediates in conjunction with an ethanol/sulfuric acid catalyst system may also be employed to produce the unsaturated, multifunctional organopolysiloxanes of this invention.

In cohydrolysis, a mixture of reactants are chosen with the amount of each selected to provide the mole fractions desired in the final product. Thus the mole fractions as set forth above with regard to "a", "b" and "c" define the structural limits in each particular composition. A slurry of the reactants in water, with the possible inclusion of an organic solvent, as known in the art is carried out. Sufficient time is allowed for hydrolysis and condensation to take place. Typically times of from 2 hours to 2 days are used to permit completion at temperatures of from −20° to 98° C. and more preferably at room temperature. The organic phase carries the product formed and is separated from the water since the organic phase is immiscible with the water. Low molecular weight by-product is stripped from the organic phase preferably with the use of heat and vacuum as known in the art to remove molecular weights below about 200. The crude product remaining after by-product removal is extracted with a base solution, washed and then dried and is the purified final product referred to as a resin product capable of further reaction to form final high molecular weight polymerizates which can be formed or shaped into contact lenses and which act as contact lens materials.

Such cohydrolysis procedures are well known in the art. Preferably ethanol-sulfuric acid catalyst is used when alkoxysilanes and acetoxysilanes are used as reactants. Preferably the silanes are mixed as in the above-noted procedure with an ethanol sulfuric acid catalyst containing a small amount of water. The reaction times and temperatures preferably are as described above as well as the workup of the crude product. Such reactions are detailed in U.S. Pat. No. 3,808,178.

Typically, the starting materials of this invention are chosen from the following classes of reactive silanes:

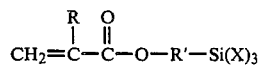

where:
R is hydrogen or methyl
R' is a divalent alkylene radical having from one to about five carbon atoms.
R" is a monovalent hydrocarbon radical having from one to about five carbon atoms, a substituted monovalent hydrocarbon radical having from one to about five carbon atoms, a phenyl group, a substituted phenyl group or a cyclohexyl group.
"x" is a readily hydrolyzable group such as chloro, methoxy, ethoxy, methoxyethoxy, or acetoxy.

The mole ratios of the various reactants will, to a large extent, control the molecular weight and structures of the resultant organopolysiloxanes. Other factors, such as temperature of reaction and the presence of a solvent, will also influence the composition of the product organopolysiloxane.

It should be understood that any of the novel organopolysiloxanes of this invention are composed of a variety of molecules, not one specific composition, and therefore must be described by an average or typical composition with perhaps more than one polymerizable group. Such structures are known and described as mixed structures or sometimes known as resins.

Preferably contact lens compositions can comprise an unsaturated, multifunctional organopolysiloxane polymerized alone or compolymerized with other monomers. The copolymers can have incorporated therein a wetting agent such as a hydrophilic monomer and a hardness modifying agent which may be a hardening agent such as methyl methacrylate or softening agents such as certain other acrylates or methacrylates.

Physical properties of the compositions disclosed in this invention can be varied through structural changes in the multifunctional organopolysiloxane component and/or by varying the type and percent of comonomer.

In one embodiment of this invention oxygen transporting, transparent, inherently wettable contact lenses made from the polymerized organopolysiloxane resins of this invention alone.

In another embodiment of this invention polymeric compositions comprising the organopolysiloxane resins of this invention copolymerized with one or more other monomers.

Such other comonomers are preferably hardening or softening agents or hydrophilic agents. As for example, hardness modifying agents can be an ester of a $C_1$-$C_{20}$ monohydric or polyhydric alkanol or phenol and an acid selected from the class consisting essentially of acrylic, methacrylic, itaconic acid and mixtures thereof. Hydrophilic monomers can be of many different materials as will be described.

When comonomers are used, the polymeric compositions of the invention are preferably prepared by means of conventional free radical polymerization techniques. The free radical initiator is incorporated in amounts of from 0.01 to 2.0% by weight of the entire composition, at reaction temperatures of from 25° C. to 125° C., to initiate and complete the polymerization. Conventional bulk polymerization procedure can be used to produce castings which can be machined and polished by conventional procedures to produce contact lenses. Alternatively, the polymerization may be carried out directly in a contact lens mold. The starting resin system is preferably polymerized to over 95% completion by free radical catalysts.

The multifunctional organopolysiloxane resins can provide for high oxygen permeability while strength and biocompatibility can be provided by other portions of the copolymer when comonomers are used. The use of methacrylate or acrylate esters provide for strength and hardness or resiliency in some cases and act to soften the material in other cases. Incorporation of a hydrophilic monomer can greatly increase the wettability of the material to achieve biocompatibility.

The novel resin compositions of this invention are prepared from an organopolysiloxane containing multiple, unsaturated polymerizable groups. Optical contact lenses are fabricated from polymerizates of these resin system monomers preferably incorporating other comonomers to provide the proper balance of physical and chemical properties desired in a contact lens. Typically, the multifunctional organopolysiloxane resin systems useful in this invention can be polymerized alone and formed into contact lenses or copolymerized with other organic components, and have the following formula:

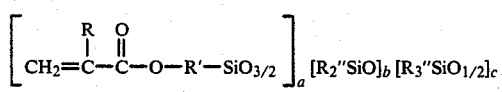

where:
R is hydrogen or methyl
R' is a divalent alkylene radical having from one to about five carbon atoms.
R" is a monovalent hydrocarbon radical having from one to about five carbon atoms, a substituted monovalent hydrocarbon radical having from one to above five carbon atoms, a phenyl group, a substituted phenyl group or a cyclohexyl group.

"a"+"b"+"c"=1, where "a", "b" and "c" are all greater than 0.

The comonomers used along with the multifunctional organopolysiloxanes in lens compositions of this invention, can be any polymerizable monomer which is capable of undergoing free radical polymerization and enhances a desirable property such as machinability, durability and biocompatibility.

Illustration of comonomers which can be usefully employed in accordance with this invention are given below.

Preferably the comonomers can be hardening or softening agents such as an ester of a $C_1$-$C_{20}$ monohydric or polyhydric alkanol or phenol and an acid selected from the class consisting essentially of acrylic and methacrylic acid. A hydrophilic hardening agent such as an itaconate mono- or di-ester can be used in addition.

The derivatives of acrylic, methacrylic and itaconic acid such as
methyl
ethyl
propyl
n-butyl
isopropyl
hexyl
hepyl
cyclohexyl
2-ethylhexyl
ethoxyethyl
butoxyethyl
2-hydroxyethyl
2- or 3-hydroxypropyl
3-methoxy-2-hydroxypropyl
tetrahydrofurfuryl
aryl
allyl
glycidoxy
are useful.

Other comonomers may include N-vinylcarbazole, N-vinylcarbazole, N-vinylpyrrolidone, hydroxy naphthyl methacrylate, styryls, such as styrene, methylstyrene, methoxy styrene and acetoxy styrene.

Allylic monomers, such as diallyl diglycol dicarbonate, diallyl phthalate, diallyl carbonate and triallyl cyanurate are also useful comonomers.

The wettability of the compositions disclosed in this invention may be enhanced by the inclusion of hydrophilic neutral monomers, hydrophilic cationic monomers and hydrophilic anionic monomers and mixtures of these, all of which act as wetting agents. The classes of these compounds are hydrophilic acrylates and methacrylates, acrylamides, methacrylamides and vinyl-lactams.

Representative hydrophilic neutral monomers which impart hydrophilic properties to the surface of contact lens materials of this invention include:
N-vinylpyrrolidone
acrylamide
methacrylamide
N,N-dimethylacrylamide or methacrylamide
2-hydroxyethyl acrylate or methacrylate
2- or 3-hydroxypropyl acrylate or methacrylate
glyceryl acrylate or methacrylate
glycidyl acrylate or methacrylate
3-methoxy-2-hydroxypropyl acrylate or methacrylate
mono esters of acrylic and methacrylic acid with polyethers of the general formula:

$HO(C_nH_{2n}O)_xH$ wherein "n" is a number from 1 to about 4 and "x" is a number from 2 to about 10.

The cationic hydrophilic monomers either can be initially in their charged form or are subsequently converted to their charged form after formation of the contact lens. The classes of these compounds are derived from basic or cationic acrylates, methacrylates, acrylamides, methacrylamides, vinylpyridines, vinylimidazoles, and diallyldialkylammonium polymerizable groups. Such monomers are represented by:

N,N-dimethylaminoethyl acrylate and methacrylate
2-methacryloyloxyethyltrimethylammonium chloride and methylsulfate
2-,4-, and 2-methyl-5-vinylpyridine
2-,4-, and 2-methyl-5-vinylpyridinium chloride and methylsulfate
N-(3-methacrylamidopropyl)-N,N-dimethylamine
N-(3-methacrylamidopropyl)-N,N,N-trimethylammonium chloride
N-(3-methacryloyloxy-2-hydroxylpropyl)-N,N,N-trimethylammonium chloride
diallyldimethylammonium chloride and methylsulfate The anionic hydrophilic monomers either are in their neutral form initially or are subsequently converted to their anionic form. These classes of compounds include polymerizable monomers which contain carboxy, sulfonate, and phosphate or phosphate groups. Such monomers are represented by:

acrylic acid
methacrylic acid
sodium acryate and methacrylate
vinylsulfonic acid
sodium vinylsulfonate
p-styrenesulfonic acid
sodium p-styrenesulfonate
2-methacryloyloxyethylsulfonic acid
3-methacryloyloxy-2-hydroxypropylsulfonic acid
2-acrylamido-2-methylpropanesulfonic acid
allylsulfonic acid
2-phosphatoethyl methacrylate When comonomers are used along with the resin systems of this invention, they are used in varying amounts. The following table illustrates the percentages and formulations possible:

| Component | Formulation 1 | Formulation 2 | Formulation 3 |
|---|---|---|---|
| Oxygen permeable three unit, unsaturated multifunctional siloxane material of this invention | 100% | 25-98% by weight | 25-98% by weight |
| Hardness modifying Agent | 0 | 75-2% | 75-1% |
| Hydrophilic agent | 0 | 0 | 1%-10% |

In certain instances it may be desirable to incorporate a crosslinking agent into a composition based on the novel organopolysiloxanes disclosed herein.

Examples of crosslinking agents include polyfunctional derivatives of acrylic acid, methacrylic acid, acrylamide, methacrylamide and multi-vinyl substituted benzenes, including but not limited to the following:

ethylene glycol diacrylate or dimethacrylate
diethylene glycol diacrylate or dimethacrylate
tetraethylene glycol diacrylate or methacrylate
polyethylene glycol diacrylate or methacrylate
trimethylolpropane triacrylate or trimethacrylate
Bisphenol A diacrylate or dimethacrylate
ethoxylated Bisphenol A diacrylate or dimethacrylate
pentaerythritol tri- and tetraacrylate or methacrylate
tetramethylenediacrylate or dimethacrylate
methylene bisacrylamide or methacrylamide
dimethylene bisacrylamide or methacrylamide
N,N'-dihydroxyethylene bisacrylamide or methacrylamide
hexamethylene bisacrylamide or methacrylamide
decamethylene bisacrylamide or methacrylamide
divinyl benzene The copolymers described in this invention are prepared by radical polymerization through the incorporation of a free radical initiator. The initiator is chosen from those commonly utilized to polymerize vinyl type monomers and would include the following representative initiators:

2,2'-azo-bis-isobutyronitrile
4,4'-azo-bis-(4-cyanopentanoic acid)
t-butyl peroctoate
benzoyl peroxide
lauroyl peroxide
methyl ethyl ketone peroxide
diisopropyl peroxycarbonate The free radical initiator is normally used in amounts of from 0.01 to 2% by weight of the entire compound. Polymerization is preferably carried out to 95% or higher of the starting material with the reaction driven to as near to 100% as possible.

The materials of this invention can be polymerized directly in a suitable mold to form contact lenses. The materials are all thermosetting and thus various methods of fabrication can be used. It is preferable to polymerize into sheet or rod stock from which contact lenses may be machined.

It is preferred to use the conventional approach when forming contact lenses such as used for polymethyl methacrylate (PMMA). In this approach, the formulations are polymerized directly into a sheet or rod and the contact lenses are cut as buttons, discs or other preformed shapes whih are then machined to obtain the lens surfaces. The resulting polymeric stock of buttons possesses the optical qualities necessary to produce aberration-free oxygen-permeagble, hard contact lenses in accorance with this invention.

The multifunctional organopolysiloxane monomers of this invention provide many advantages when utilized as the basis for contact lens materials. The disclosed monomers are substantially organopolysiloxane but contain multiple functional groups which allows for rapid incorporation into a copolymer system by free radical polymerization. Furthermore, because of the presence of the multifunctional, polymerizable groups the organopolysiloxane portion is compatibilized in the copolymer structure.

The oxygen demand of the human cornea has been well established and contact lenses made from the polymers and copolymers of this invention can meet and easily exceed this requirement.

Because of the unique properties of the compositions, the contact lenses formed thereof have high oxygen permeability while maintaining other essential properties such as clarity, wettability and durability. Oxygen permeability is meant to include polymeric materials which have an oxygen permeability of greater than $4 \times 10^{-11}$ ml $O_2$ cm$^2$/sec ml mm Hg.

The following Examples are given to illustrate the invention and are not meant to be limiting:

EXAMPLE 1

A mixture of 150 ml (0.632 moles) γ-methacryloxypropyltrimethoxysilane, 155 ml (1.264 Mole) trimethylchlorosilane and 155 ml (1.264) mole) dimethyldichlorosilane was slowly added to 600 ml of water with stirring. The temperature of the hydrolysis was maintained at approximately 40° to 50° C. during the admixing.

After stirring overnight the aqueous phase was separated and the organic phase was washed with an equal volume of water. The volatiles were then stripped from the organic phase using high vacuum at a temperature of about 70°-75° C. The crude product was then extracted with a sodium hydroxide/sodium sulfate solution followed by a washing with a sodium sulfate solution. The organopolysiloxane was then dried with magnesium sulfate yielding 230 ml of product.

This material, having a viscosity of 13.2 centistokes at 25° C., was designated PS-1. Nuclear magnetic resonsance (silicon 29) analyis showed the following groups to be present in the indicated mole ratio:

| GROUPS | CALCULATED | FOUND |
|---|---|---|
| $\begin{array}{c}\text{CH}_3 \quad \text{O} \\ | \quad \| \\ \text{CH}_2=\text{C}—\text{C}—\text{OCH}_2\text{CH}_2\text{CH}_2\text{SiO}_{3/2}\end{array}$ | 0.20 | 0.32 |
| $(CH_3)_2SiO$ | 0.40 | 0.42 |
| $(CH_3)_3SiO_{1/2}$ | 0.40 | 0.26 |

EXAMPLE 2

A mixture of 150 ml (0.632 mole) γ-methacryloxypropyltrimethoxysilane, 155 ml (1.264 mole) trimethylchlorosilane and 155 ml (1.264 mole) dimethyldichlorosilane was slowly added to slurry of 300 ml of diethylether and 300 ml of water. The temperature of the hydrolysis was maintained at about 40° C. by allowing the ether to reflux.

After stirring overnight the aqueous phase was separated and the organic phase was washed with an equal volume of water. The volatiles were then stripped from the organic phase using high vacuum at a temperature of about 70°-75° C. The crude product was then extracted with a sodium hydroxide/sodium sulfate solution followed by a washing with a sodium sulfate solution. The organopolysiloxane was then dried with magnesium sulfate yielding 230 ml of product.

This material, having a viscosity of 14.8 centistokes at 25° C., was designated PS-2. Nuclear magnetic resonsance (silicon 29) analysis showed the following groups to be present in the indicated mole ratio:

| GROUPS | CALCULATED | FOUND |
|---|---|---|
| $\begin{array}{c}\text{CH}_3 \quad \text{O} \\ | \quad \| \\ \text{CH}_2=\text{C}—\text{C}—\text{OCH}_2\text{CH}_2\text{CH}_2\text{SiO}_{3/2}\end{array}$ | 0.20 | 0.29 |
| $(CH_3)_2SiO$ | 0.40 | 0.44 |

-continued

| GROUPS | CALCULATED | FOUND |
|---|---|---|
| $(CH_3)_3SiO_{1/2}$ | 0.40 | 0.27 |

EXAMPLE 3

A mixture of 150 ml (0.632 moles) γ-methacryloxypropyltrimethoxysilane, 155 ml (1.264 mole) trimethylchlorosilane and 155 ml (1.264 mole) dimethyldichlorosilane was slowly added to a solution of 300 ml methanol and 300 ml of water with stirring. The temperature of the hydrolysis was maintained at approximately 40° to 50° C. during the admixing.

After stirring overnight the aqueous phase was separated and the organic phase was washed with an equal volume of water. The volatiles were then stripped from the organic phase using high vacuum at a temperature of about 70°-75° C. The crude product was then extracted with a sodium hydroxide/sodium sulfate solution followed by a washing with a sodium sulfate solution. The organopolysiloxane was then dried with magnesium sulfate yielding 200 ml of product.

This material, having a viscosity of 24.4 centistokes at 25° C., was designated PS-3. Nuclear magnetic resonsance (silicon 29) analysis showed the following groups to be present in the indicated mole ratio:

| GROUPS | CALCULATED | FOUND |
|---|---|---|
| $\begin{array}{c}\text{CH}_3 \quad \text{O} \\ | \quad \| \\ \text{CH}_2=\text{C}—\text{C}—\text{OCH}_2\text{CH}_2\text{CH}_2\text{SiO}_{3/2}\end{array}$ | 0.20 | 0.24 |
| $(CH_3)_2SiO$ | 0.40 | 0.46 |
| $(CH_3)_3SiO_{1/2}$ | 0.40 | 0.30 |

EXAMPLE 4

A mixture of 150 ml (0.632 moles) γ-methacryloxypropyltrimethoxysilane, 78 ml (0.632 mole) trimethylchlorosilane and 233 ml (1.896 mole) dimethyldichlorosilane was slowly added to 600 ml of water with stirring. The temperature of the hydrolysis was maintained at approximately 40° to 50° C. during the admixing.

After stirring overnight the aqueous phase was separated and the organic phase was washed with an equal volume of water. The volatiles were then stripped from the organic phase using high vacuum at a temperature of about 70°-75° C. The crude product was then extracted with a sodium hydroxide/sodium sulfate solution followed by a washing with a sodium sulfate solution. The organopolysiloxane was then dried with magnesium sulfate yielding 220 ml of product.

This material, having a viscosity of 30.2 centistokes at 25° C., was designated PS-4. Nuclear magnetic resonsance (silicon 29) analysis showed the following groups to be present in he indicated mole ratio:

| GROUPS | CALCULATED | FOUND |
|---|---|---|
| $\begin{array}{c}\text{CH}_3 \quad \text{O} \\ | \quad \| \\ \text{CH}_2=\text{C}—\text{C}—\text{OCH}_2\text{CH}_2\text{CH}_2\text{SiO}_{3/2}\end{array}$ | 0.20 | 0.16 |
| $(CH_3)_2SiO$ | 0.60 | 0.59 |

| GROUPS | CALCULATED | FOUND |
|---|---|---|
| $(CH_3)_3SiO_{1/2}$ | 0.20 | 0.25 |

EXAMPLE 5

A mixture of 150 ml (0.632 mole) γ-methacryloxypropyltrimethoxysilane, 78 ml (0.632 mole) trimethylchlorosilane and 233 ml (1.896 mole) dimethyldichlorosilane was slowly added to slurry of 300 ml of diethylether and 300 ml of water. The temperature of the hydrolysis was maintained at about 40° C. by allowing the ether to reflux.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 225 ml of product.

This material, having a viscosity of 28.0 centistokes at 25° C., was designated PS-5. Nuclear magnetic resonsance (silicon 29) analysis showed the following groups to be present in he indicated mole ratio:

| GROUPS | CALCULATED | FOUND |
|---|---|---|
| $CH_2{=}C(CH_3){-}C({=}O){-}OCH_2CH_2CH_2SiO_{3/2}$ | 0.20 | 0.17 |
| $(CH_3)_2SiO$ | 0.60 | 0.57 |
| $(CH_3)_3SiO_{1/2}$ | 0.20 | 0.26 |

EXAMPLE 6

A mixture of 150 ml (0.632 mole) γ-methacryloxypropyltrimethoxysilane, 78 ml (0.632 mole) trimethylchlorosilane and 233 ml (1.896 mole) dimethyldichlorosilane was slowly added to a solution of 300 ml methanol and 300 ml of water with stirring. The temperature of the hydrolysis was maintained at approximately 40° C.–50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 105 ml of product.

This material, having a viscosity of 63.7 centistokes at 25° C., was designated PS-6. Nuclear magnetic resonsance (silicon 29) analysis showed the following groups to be present in he indicated mole ratio:

| GROUPS | CALCULATED | FOUND |
|---|---|---|
| $CH_2{=}C(CH_3){-}C({=}O){-}OCH_2CH_2CH_2SiO_{3/2}$ | 0.20 | 0.10 |
| $(CH_3)_2SiO$ | 0.60 | 0.65 |

| GROUPS | CALCULATED | FOUND |
|---|---|---|
| $(CH_3)_3SiO_{1/2}$ | 0.20 | 0.25 |

EXAMPLE 7

A mixture of 150 ml (0.632 mole) γ-methacryloxypropyltrimethoxysilane, 116 ml (0.948 mole) trimethylchlorosilane and 194 ml (1.580 mole) dimethyldichlorosilane was slowly added to 600 ml of water with stirring. The temperature of the hydrolysis was maintained at approximately 40° C. to 50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 205 ml of product.

This material, having a viscosity of 21.6 centistokes at 25° C., was designated PS-7. Nuclear magnetic resonsance (silicon 29) analysis showed the following groups to be present in he indicated mole ratio:

| GROUPS | CALCULATED | FOUND |
|---|---|---|
| $CH_2{=}C(CH_3){-}C({=}O){-}OCH_2CH_2CH_2SiO_{3/2}$ | 0.20 | 0.27 |
| $(CH_3)_2SiO$ | 0.50 | 0.49 |
| $(CH_3)_3SiO_{1/2}$ | 0.30 | 0.24 |

EXAMPLE 8

A mixture of 150 ml (0.632 mole) γ-methacryloxypropyltrimethoxysilane, 116 ml (0.948 mole) trimethylchlorosilane and 194 ml (1.580 mole) dimethyldichlorosilane was slowly added to 300 ml methanol and 300 ml of water with stirring. The temperature of the hydrolysis was maintained at approximately 40° C. to 50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 225 ml of product.

This material, having a viscosity of 13.3 centistokes at 25° C., was designated PS-8. Nuclear magnetic resonsance (silicon 29) analysis showed the following groups to be present in he indicated mole ratio:

| GROUPS | CALCULATED | FOUND |
|---|---|---|
| $CH_2{=}C(CH_3){-}C({=}O){-}OCH_2CH_2CH_2SiO_{3/2}$ | 0.20 | 0.27 |
| $(CH_3)_2SiO$ | 0.50 | 0.51 |

| GROUPS | CALCULATED | FOUND |
|---|---|---|
| $(CH_3)_3SiO_{1/2}$ | 0.30 | 0.24 |

EXAMPLE 9

A mixture of 150 ml (0.632 mole) γ-methacryloxypropyltrimethoxysilane, 232 ml (1.896 mole) trimethylchlorosilane and 232 ml (1.896 mole) dimethyldichlorosilane was slowly added to 600 ml of water with stirring. The temperature of the hydrolysis was maintained at approximately 40° C. to 50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 245 ml of product.

This material, having a viscosity of 10.7 centistokes at 25° C., was designated PS-9. Nuclear magnetic resonance (silicon 29) analysis showed the following groups to be present in he indicated mole ratio:

| GROUPS | CALCULATED | FOUND |
|---|---|---|
| $CH_2=C(CH_3)-C(O)-OCH_2CH_2CH_2SiO_{3/2}$ | 0.14 | 0.37 |
| $(CH_3)_2SiO$ | 0.43 | 0.43 |
| $(CH_3)_3SiO_{1/2}$ | 0.43 | 0.20 |

EXAMPLE 10

A mixture of 150 ml (0.632 mole) γ-methacryloxypropyltrimethoxysilane, 232 ml (1.896 mole) trimethylchlorosilane and 232 ml (1.896 mole) dimethyldichlorosilane was slowly added to a solution of 300 ml methanol and 300 ml of water with stirring. The temperature of the hydrolysis was maintained at approximately 40° C. to 50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 273 ml of product.

This material, having a viscosity of 8.1 centistokes at 25° C., was designated PS-10. Nuclear magnetic resonance (silicon 29) analysis showed the following groups to be present in he indicated mole ratio:

| GROUPS | CALCULATED | FOUND |
|---|---|---|
| $CH_2=C(CH_3)-C(O)-OCH_2CH_2CH_2SiO_{3/2}$ | 0.14 | 0.36 |
| $(CH_3)_2SiO$ | 0.43 | 0.44 |

| GROUPS | CALCULATED | FOUND |
|---|---|---|
| $(CH_3)_3SiO_{1/2}$ | 0.43 | 0.20 |

EXAMPLE 11

A mixture of 75 ml (0.316 mole) γ-methacryloxypropyltrimethoxysilane, 78 ml (0.632 mole) trimethylchlorosilane and 267 ml (2.212 mole) dimethyldichlorosilane was slowly added to 600 ml of water with stirring. The temperature of the hydrolysis was maintained at approximately 40° C. to 50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 112 ml of product.

This material, having a viscosity of 13.1 centistokes at 25° C., was designated PS-11. Nuclear magnetic resonance (silicon 29) analysis showed the following groups to be present in he indicated mole ratio:

| GROUPS | CALCULATED | FOUND |
|---|---|---|
| $CH_2=C(CH_3)-C(O)-OCH_2CH_2CH_2SiO_{3/2}$ | 0.10 | 0.21 |
| $(CH_3)_2SiO$ | 0.70 | 0.63 |
| $(CH_3)_3SiO_{1/2}$ | 0.20 | 0.16 |

EXAMPLE 12

A mixture of 75 ml (0.316 mole) γ-methacryloxypropyltrimethoxysilane, 78 ml (0.632 mole) trimethylchlorosilane and 267 ml (2.212 mole) dimethyldichlorosilane was slowly added to 300 ml methanol and 300 ml of water with stirring. The temperature of the hydrolysis was maintained at approximately 40° C. to 50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 147 ml of product.

This material, having a viscosity of 9.4 centistokes at 25° C., was designated PS-12. Nuclear magnetic resonsance (silicon 29) analysis showed the following groups to be present in he indicated mole ratio:

| GROUPS | CALCULATED | FOUND |
|---|---|---|
| $CH_2=C(CH_3)-C(O)-OCH_2CH_2CH_2SiO_{3/2}$ | 0.10 | 0.22 |
| $(CH_3)_2SiO$ | 0.70 | 0.60 |

-continued

| GROUPS | CALCULATED | FOUND |
|---|---|---|
| $(CH_3)_3SiO_{1/2}$ | 0.20 | 0.18 |

EXAMPLE 13

A mixture of 75 ml (0.316 mole) γ-methacryloxypropyltrimethoxysilane, 39 ml (0.316 mole) trimethylchlorosilane and 300 ml (2.528 mole) dimethyldichlorosilane was slowly added to 600 ml of water with stirring. The temperature of the hydrolysis was maintained at approximately 40° C. to 50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 125 ml of product.

This material, having a viscosity of 16.8 centistokes at 25° C., was designated PS-13. Nuclear magnetic resonsance (silicon 29) analysis showed the following groups to be present in he indicated mole ratio:

| GROUPS | CALCULATED | FOUND |
|---|---|---|
| $CH_2{=}\underset{\;\;\;\;\;\;\;\;\;\;\;\;\;\;CH_3}{C}{-}\underset{\;\;\;\;\;\;\;O}{C}{-}OCH_2CH_2CH_2SiO_{3/2}$ | 0.10 | 0.12 |
| $(CH_3)_2SiO$ | 0.80 | 0.74 |
| $(CH_3)_3SiO_{1/2}$ | 0.10 | 0.14 |

EXAMPLE 14

A mixture of 75 ml (0.316 mole) γ-methacryloxypropyltrimethoxysilane, 39 ml (0.316 mole) trimethylchlorosilane and 300 ml (2.528 mole) dimethyldichlorosilane was slowly added to 300 ml methanol and 300 ml of water with stirring. The temperature of the hydrolysis was maintained at approximately 40° C. to 50° C. during the admixing.

After stirring overnight the aqueous phase was separated and the organic phase was washed with an equal volume of water. The volatiles were then stripped from the organic phase using high vacuum at a temperature of about 70°–75° C. The crude product was then extracted with a sodium hydroxide/sodium sulfate solution followed by a washing with a sodium sulfate solution. The organopolysiloxane was then dried with magnesium sulfate yielding 144 ml of product.

This material, having a viscosity of 13.6 centistokes at 25° C., was designated PS-14. Nuclear magnetic resonsance (silicon 29) analysis showed the following groups to be present in he indicated mole ratio:

| GROUPS | CALCULATED | FOUND |
|---|---|---|
| $CH_2{=}\underset{\;\;\;\;\;\;\;\;\;\;\;\;\;\;CH_3}{C}{-}\underset{\;\;\;\;\;\;\;O}{C}{-}OCH_2CH_2CH_2SiO_{3/2}$ | 0.10 | 0.10 |
| $(CH_3)_2SiO$ | 0.80 | 0.76 |
| $(CH_3)_3SiO_{1/2}$ | 0.10 | 0.14 |

EXAMPLE 15

Hard oxygen-permeable lens materials are made from selected comonomer mixtures of methyl methacrylate (MMA), PS-1, PS-2, PS-3 and methacrylic acid (MA) using the free radical initiator 2,2′-azobisisobutyronitrile (AIBN). The formulation components (shown in Table I in parts by weight) are thoroughly mixed, transferred to test tubes which are purged with nitrogen then sealed with serum caps. The test tubes are then placed in a water bath at 40° C. and allowed to polymerize for three days. The tubes are then placed in a 65° C. oven for an additional time period of 2 days, after which the polymerized rods are removed from the tubes. The hard, transparent rods are then subjected to conditioning for approximately twenty-four (24) hours at 100° C. under vacuum to complete polymerization process and relieve any mechanical stresses present. The conditioned rods are then machined to contact lens blanks (a disc ½ inch in diameter by 3/16 inch thick).

Oxygen permeability values of the contact lenses produced from the materials described here were generated by a procedure as described in ASTM D1434 except that plano contact lenses are used instead of large flat discs of material. The permeability apparatus was constructed in such a manner as to accept actual contact lenses and calibrated with other polymeric oxygen permeability data reported in Table I, polymethyl methacrylate, polycarbonate, and polystyrene have oxygen permeability of 1,22, and 35 $cm^3$ mm/$cm^2$ sec cm Hg × $10^{-10}$, respectively.

TABLE I

| COMPOSITION (parts by wt.) | | | | | | OXYGEN* | HARDNESS |
|---|---|---|---|---|---|---|---|
| MMA | PS-1 | PS-2 | PS-3 | MA | AIBN | PERMEABILITY | ROCKWELL R |
| 60 | 35 | — | — | 5 | 0.2 | 57 | 120 |
| 50 | 45 | — | — | 5 | 0.2 | 147 | 113 |
| 60 | — | 35 | — | 5 | 0.2 | 55 | 120 |
| 50 | — | 45 | — | 5 | 0.2 | 140 | 118 |
| 60 | — | — | 35 | 5 | 0.2 | 70 | 119 |
| 50 | — | — | 45 | 5 | 0.2 | 170 | 117 |

*Value in $cm^3 mm/cm^2$ sec cm Hg × $10^{10}$

EXAMPLE 16

Utilizing the Experimental Procedures of Example 15 this Example illustrates the preparation and properties of materials suitable for producing hard contact lenses.

| COMPOSITION (parts by wt.) | | | | | | HARDNESS |
|---|---|---|---|---|---|---|
| MMA | PS-4 | PS-5 | PS-6 | MA | AIBN | ROCKWELL R |
| 50 | 45 | — | — | 5 | 0.2 | 114 |
| 50 | — | 45 | — | 5 | 0.2 | 114 |
| 50 | — | — | 45 | 5 | 0.2 | 111 |

EXAMPLE 17

Utilizing the Experimental Procedures of Example 15 this Example illustrates the preparation and properties of materials suitable for producing hard contact lenses.

| COMPOSITION (parts by wt.) | | | | | HARDNESS |
|---|---|---|---|---|---|
| MMA | PS-7 | PS-8 | MA | AIBN | ROCKWELL R |
| 50 | 45 | — | 5 | 0.2 | 116 |
| 50 | — | 45 | 5 | 0.2 | 115 |

EXAMPLE 18

Utilizing the Experimental Procedures of Example 15 this Example illustrates the preparation and properties of materials suitable for producing hard contact lenses.

| COMPOSITION (parts by wt.) | | | | | HARDNESS |
|---|---|---|---|---|---|
| MMA | PS-9 | PS-10 | MA | AIBN | ROCKWELL R |
| 50 | 45 | — | 5 | 0.2 | 108 |
| 50 | — | 45 | 5 | 0.2 | 103 |

EXAMPLE 19

Utilizing the Experimental Procedures of Example 15 this Example illustrates the preparation and properties of materials suitable for producing hard contact lenses.

| COMPOSITION (parts by wt.) | | | | | |
|---|---|---|---|---|---|
| MMA | PS-11 | PS-12 | MA | AIBN | PROPERTIES |
| 55 | 45 | — | — | 0.2 | T |
| 50 | 45 | — | 5 | 0.2 | NT |
| 55 | — | 45 | — | 0.2 | T |
| 50 | — | 45 | 5 | 0.2 | NT |

T = Transparent
NT = Hazy

EXAMPLE 20

Utilizing the Experimental Procedures of Example 15 this Example illustrates the preparation and properties of materials suitable for producing hard contact lenses.

| COMPOSITION (parts by wt.) | | | | | |
|---|---|---|---|---|---|
| MMA | PS-13 | PS-14 | MA | AIBN | PROPERTIES |
| 55 | 45 | — | — | 0.2 | T |
| 60 | 35 | — | 5 | 0.2 | NT |
| 55 | — | 45 | — | 0.2 | T |

| COMPOSITION (parts by wt.) | | | | | |
|---|---|---|---|---|---|
| MMA | PS-13 | PS-14 | MA | AIBN | PROPERTIES |
| 60 | — | 35 | 5 | 0.2 | NT |

T = Transparent
NT = Hazy

The above Examples illustrate the preparation of the resin systems of this invention and admixture and copolymerization with methyl methacrylate and methacrylic acid. As previously described, other comonomers can be used with the resin systems to form polymerized products. In some cases, the resin systems can be polymerized themselves to form hard contact lens materials. When the resins of this invention are homopolymerized and used for contact lenses, it is preferred to surface treat such lenses as by conventional oxidation or grafting to make the surfaces wettable.

We claim:

1. A contact lens consisting essentially of polymerized material formed from
   (A) 25 to 98% by weight of the resin system having the following formula:

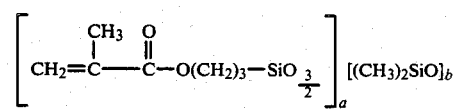

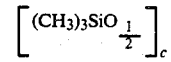

$a = 0.10$ to $0.40$ mole fraction
   $b = 0.25$ to $0.80$ mole fraction
   $c = 0.10$ to $0.40$ mole fraction,
   (B) 75 to 2% by weight of an ester of a $C_1$-$C_{20}$ monohydric or polyhydric alkanol or phenol and an acid selected fom the class consisting essentially of acrylic, methacrylic, itaconic acid and mixtures thereof, and
   (C) 1 to 10% of a hydrophilic agent,
   which material is polymerized to a degree above 95% completion by free radical polymerization.

2. A contact lens in accordance with claim 1 wherein
   (A) is in the range of from 30 to 60% by weight,
   $a = 0.20$ to $0.35$ mole fraction
   $b = 0.40$ to $0.60$ mole fraction
   $c = 0.20$ to $0.40$ mole fraction
   (B) is 69 to 40% by weight and is methylmethacrylate
   (C) is 1 to 10% by weight 3. A contact lens in accordance with claim 1 wherein C is vinylpyrrolidone.

4. A contact lens in accordance with claim 1 wherein C is acrylic acid.

5. A contact lens in accordance with claim 1 wherein C is methacrylic acid.

* * * * *